Feb. 1, 1966    G. L. HAMMON    3,232,538
HEATING TORCHES
Original Filed Nov. 27, 1961    3 Sheets-Sheet 2
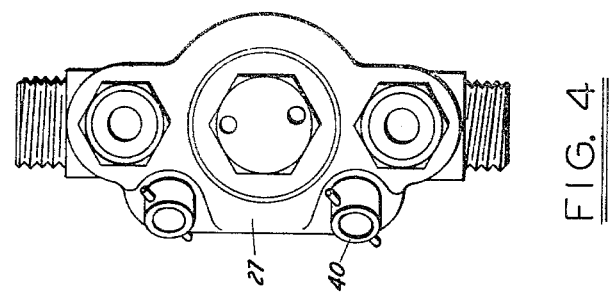
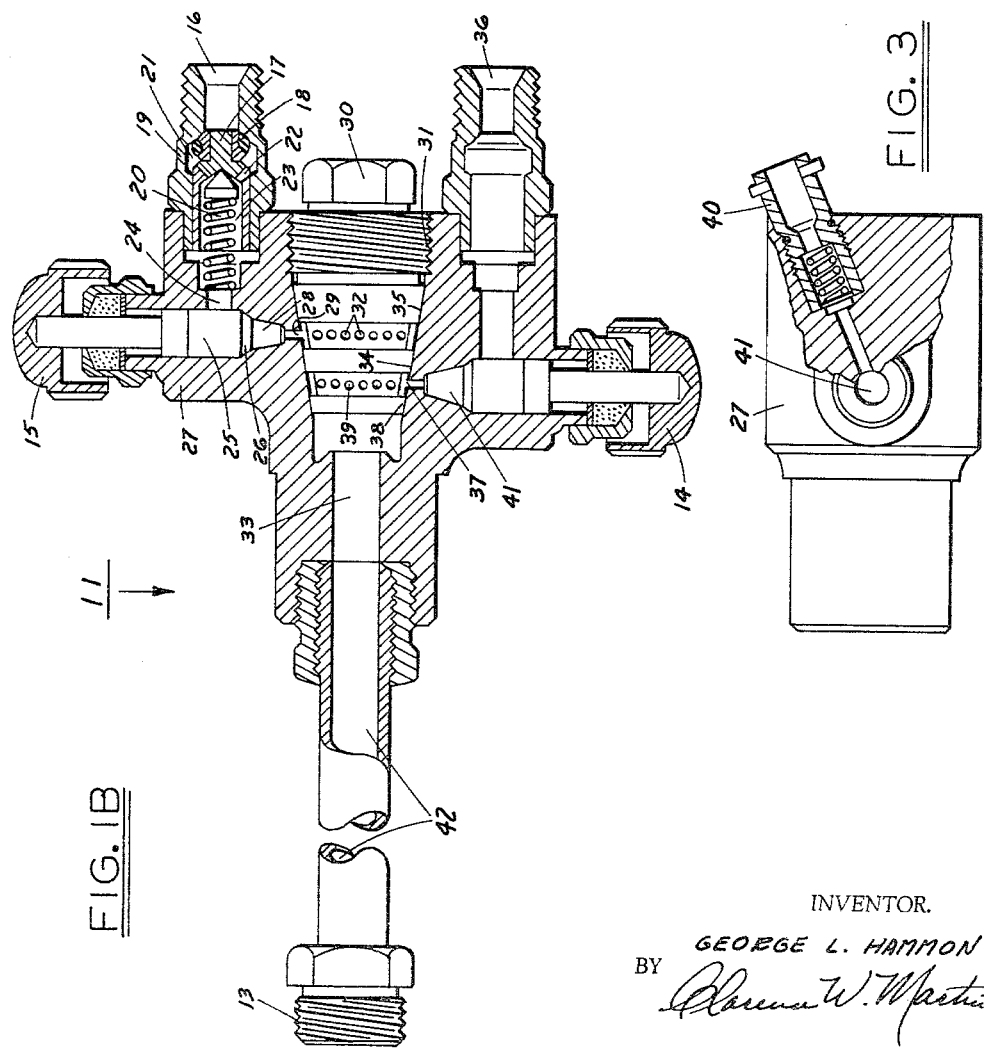
INVENTOR.
GEORGE L. HAMMON
BY

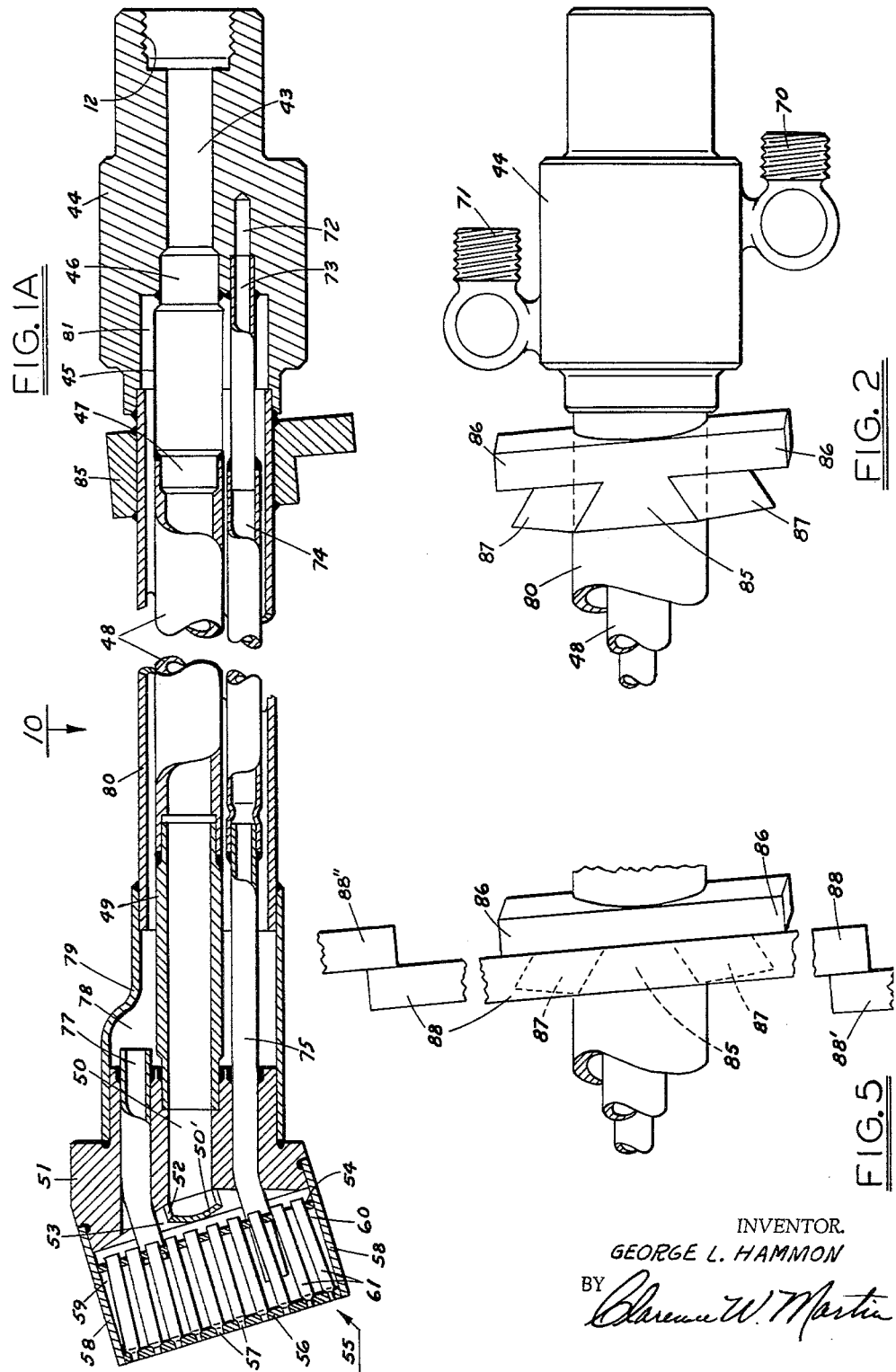

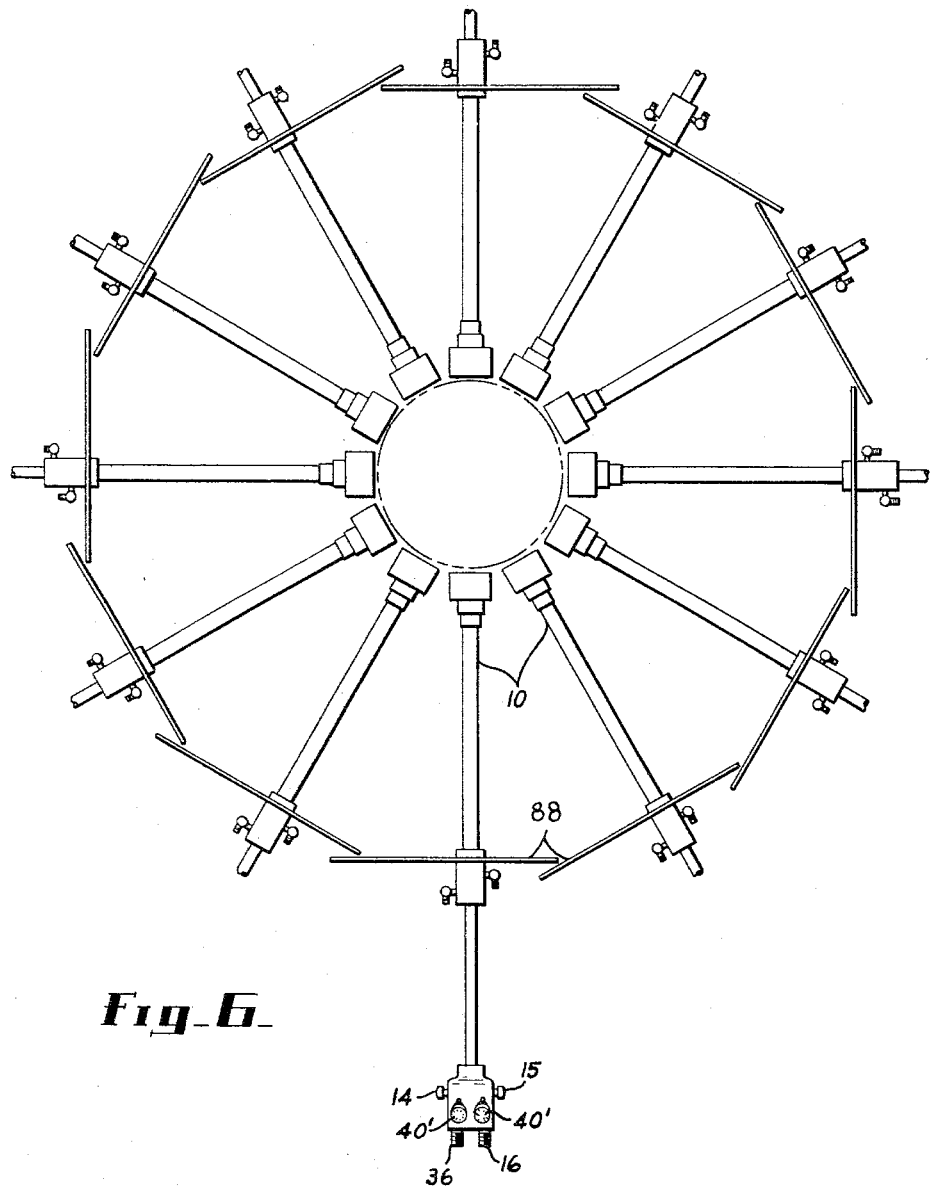

United States Patent Office 3,232,538
Patented Feb. 1, 1966

3,232,538
HEATING TORCHES
George L. Hammon, Oakland, Calif., assignor to Hammon Precision Equipment Company, Oakland, Calif., a corporation of California
Continuation of abandoned application Ser. No. 154,952, Nov. 27, 1961. This application Nov. 22, 1963, Ser. No. 325,717
2 Claims. (Cl. 239—132.3)

This application is a continuation of application Serial No. 154,952, filed November 27, 1961, now abandoned.

The present invention relates to gas torches for producing extremely high heat and more particularly relates to means for protecting the torch itself and the operator from the heat so produced; furthermore, the invention relates to means for coupling a plurality of such torches to produce a bank of torches surrounding an object which is to be heated uniformly and simultaneously over its entire surface.

The torch of the present invention has found particular utility in simulating a heat condition which is encountered by the head of a missile re-entering the earth's atmosphere. Under such conditions, the speed of re-entry and the friction of the air produces an extremely high heat in a very short period of time. Since the reaction of the metals or other materials to re-entry produced heat must be known before attempting the firing of a missile which is to be recovered, conditions simulating such re-entry head are required.

According to the invention, such conditions are met by the torch of the present invention. This torch or bank of torches provides an instantaneous source of heat of a predetermined range of temperature and applies such heat over the entire, or selected surfaces of the missile.

Another aspect of the invention is that the torch head which produces a heat, capable of destroying the torch itself, must be protected from such heat. Also, the torch operator and the controls on the end of the torch opposite the torch head must be protected from the heat produced by the torch and from the heat reflected from the object so heated.

It is, therefore, a main object of the invention to provide an improved torch capable of producing extremely high temperatures in a short period of time.

Still another object is to protect a torch operating within ranges of heat which would otherwise destroy the torch.

A further object is to shield a portion of the torch and the torch operator from the heat produced by the torch.

Other objects and advantages of the invention will become apparent from the following description, given by way of example only, in connection with the drawings in which:

FIGURES 1A and 1B are side views of two portions of the torch, shown partially in section, the two portions being threaded together to form a unitary torch;

FIGURE 2 is a top view of a portion of the torch shown in FIGURE 1A;

FIGURE 3 is a top view, partially in section, of a portion of the torch shown in FIGURE 1B;

FIGURE 4 is an end view of a portion of the torch shown in FIGURE 1B;

FIGURE 5 is a top view of a protective plate which is mounted on the torch; and

FIGURE 6 is a top view showing torches arranged in position to surround an object to be heated.

The torch shown in FIGURES 1A and 1B comprises two portions generally indicated at 10 and 11 which are threaded together at 12 and 13 to produce the torch unit. Portion 11 comprises valve handles 14 and 15 for controlling the amount of two respective gases which form a combustible mixture. For purposes of the present disclosure, these two gases will be referred to hereinafter as hydrogen and oxygen, although other gases may be provided. Oxygen, under high pressure, enters at 16 and forces a check valve comprising a sleeve 17 and an O ring 18 toward the left within a casing 19 and against the pressure of a spring 20. At such time oxygen flows around the O ring, into a chamber 21, and through openings 22 into a chamber 23 within the sleeve 17 and into a chamber 24. Handle 15 controls a valve stem 25 which normally is seated against a shoulder 26 of body 27. Withdrawal of the valve stem permits oxygen to flow through a port 28 into a chamber 29. A gas mixing unit 30 is tightly threaded into body 27 as at 31 and is of conventional type such as disclosed in the U.S. Patent No. 2,507,102 issued May 9, 1950.

The mixing unit comprises oxygen inlet ports 32 which lead to a plurality of respective gas aspirating tubes which emit into a chamber 33. Shoulders 34 and 35 on the mixing unit surround an undercut circumferential ring cut into the mixing unit and prevent the escape of oxygen between the mixing unit and the body 27.

Hydrogen gas enters at 36 under high pressure and is controlled by a valve similar to that described above for the oxygen gas. Controlled amounts of hydrogen are emitted into a circumferential chamber 37, surrounded by shoulders 34 and 38 on the mixing unit, and then the hydrogen gas flows through ports 39 in the mixing unit. Ports 39 open into the previously mentioned aspirating tubes in the mixing unit where the oxygen and hydrogen are mixed, after which they are emitted into chamber 33.

Two connectors 40, such as shown in FIGURE 4 are provided, one of which communicates with the oxygen chamber 28 and the other of which communicates with a similar chamber 41 of the hydrogen valve. Respective manometers 40' (FIGURE 6) are attached to connectors to record the pressures within the chambers 29 and 37. Thus, when a plurality of gas torches are used, as described hereinafter, the torches may be preset to operate under identical oxygen and hydrogen pressures to thereby each produce a controlled heat.

The mixed gases then flow from passageway 33 into a tube 42 which leads to a chamber 43 (FIGURE 1A) in a fixture or body portion 44. Tube 42 (FIGURE 1B) is formed of a metal having a relatively lower melting point than the remainder of the torch and comprises a fuse line which may erupt in case of a back-fire within the torch.

A gas passage unit 45 (FIGURE 1A), having reduced opposite end shoulders 46 and 47, is connected at one end to body portion 44 and at its opposite end to a tube 48. The latter is connected at its opposite end to a tube 49. Mixed gases are transmitted from chamber 43 through unit 45, tubes 48 and 49 to a passage 50 formed in a body portion 51. The leftmost end of the passage 50 opens into a cap 50' mounted on the body portion 51 and has gas holes 52 cut therein to disperse gas into a chamber 53 formed between the leftmost end of body portion 51 and a supporting plate 54.

The plate 54 forms a portion of a gas burning head, generally indicated at 55. A face plate 56, having a plurality of holes 57 cut therein is connected by top and bottom body plates 58 to plate 54. Side plates 59, one of which is shown, are also connected to plates 54, 56 and 58 to form a rectangularly shaped box enclosing a chamber 60. A plurality of tubes 61, arranged in rows in a rectangular array, one row of which is shown, are provided to transmit the gas mixture from the chamber 53 to the exterior surface of the face plate 56 where the gases are ignited to form a torch.

It will be noted that the tubes are not parallel to each other but are arranged at their leftmost ends to diverge from each other so that the ends of the tubes on the edge of the torch head 56 lie close to, and at an angle to the top, bottom, and side plates 58 and 59. In this manner, the flame of the torch is evenly spread over a predetermined area greater than the area of the plate 56. Thus, a large surface may be uniformly heated by one torch, or when the area to be heated requires the use of a plurality of torches, the torches may be spaced predetermined distances from each other.

In most applications, such as where the torches are banked to surround a nose cone of a missile, or the like, the torch heads are located so closely to the objective that the flame, or flames, are deflected back over the torch head, thus subjecting the head to such extremes of heat that the head tends to destroy itself, if means are not provided to prevent this action. Therefore, the following means are provided to cool the torch head and a portion of the torch body.

On the sides of the portion 44 (FIGURE 2) there is provided a water inlet nipple 70 and a water outlet nipple 71. Water, under pressure, flows from nipple 70 into a chamber 72 (FIGURE 1A) and then through a series of tubes 73, 74 and 75 into the previously mentioned chamber 60 where the water circulates around the array of tubes 61, thus cooling the face plate 56, the top and bottom plates 58 and the side plates 59 as well as the tubes 61. The heated water returns from chamber 60 to the outlet nipple 71 by the following means. A tube 77 transmits the water from chamber 60 into a chamber 78 formed by a body portion 79. The latter is connected to body portion 51 and a tube 80 forming another body portion connected to body portion 44. The body portion 79 and the tube 80 form an elongate housing extending from the body portion 51 to the body portion or fixture 44 so that water passes from chamber 78 through tube 80 and into a chamber 81 having communication with nipple 71. In this manner, the torch head and the body portions between the head and the body portion 44 are protected against the high temperature which surround the torch or torches.

In order to protect the torch operator and the manual controls on the torch, each torch is provided with a heat deflecting plate, and when a plurality of torches is used, the deflector plates are overlapped in such a manner as to present a wall of plates between the operator and the flames.

For this purpose, a mounting base 85 (FIGURE 2) is closely fitted over and fixed on the body portion 80 before the latter is connected to body portion 44. The transverse wings 86 of the base are mounted at an angle relative to a line normal to the axis of tube 80, and has a pair of cut-away portions 87 which define a pair of sloping walls forming the male fitting of a dove tail connector. A deflector plate 88 (FIGURE 5) is cut away on its bottom surface to form the female portion of the dove tail connector and is mounted on the base 85 merely by sliding it on the base. The plate 88 lies parallel to wings 86 and forms the same previously defined angle relative to tube 80.

It will be observed that when a plurality of torches is used, the plate 88 of one torch lies in overlapping relationship to an adjacent torch plate, such as indicated at 88' and 88". In this manner a wall of plates is formed. If, as in the application of the torches to a nose cone, for example, the torches surround the object to be heated, the plates form an enclosure which not only protects the operator, but also forms a chamber within which the heat is confined about the object, thus assisting in the heating operation.

It is to be understood that the torches may be used singly in some applications, or in banks, as described. In the latter case, a dummy run of the torches on a test objective establishes the optimum operating conditions for producing the desired degree of temperature. The two gases, each from a common source, are fed to the torch heads under the control of the torch valves which are manually adjusted to produce the same manometer readings, or such different conditions as desired. Thus, all torches may be preset to an operating condition and then by use of a single main valve in each supply line from the hydrogen and oxygen sources, the same operating conditions may be established for a series of torch heating operations.

I claim:

1. In a heating torch, a first plate having a plurality of holes therein extending over the area of the plate, a second plate spaced from the first plate and having at least a major portion thereof extending parallel to said first plate, said plate having a plurality of holes therein equal in number to the number of holes in the first plate, a plurality of tubes of relatively small diameter mounted in said holes in said first and second plates and extending between said first and second plates, said tubes being spaced apart so that there is a space between each tube and the adjacent tube, wall means connecting said first and second plates so that said first and second plates, said tubes, and said wall means form a closed chamber, said tubes having a length which is less than the longest dimension of said chamber, a body mounted on said wall means and forming a chamber outside said first named chamber and adjacent to the second plate so that the tubes mounted in said plates open into said second named chamber, said body having a passage therein opening into said second named chamber, a fixture spaced from said body, an elongate housing extending from said fixture to said body and forming a closed compartment, said fixture having a flow passage therein, a tube disposed in said housing and having one end in communication with said flow passage in said fixture and having the other end extending into said body and opening into said passage in said body, means for supplying mixed gases to the flow passage in said fixture so that the mixed gases pass through said tube in said housing into said second chamber and into said tubes mounted in said first and second plates, a cooling water inlet tube disposed in said housing and having one end mounted in said fixture and having the other end extending through said body and through said second plate into said first named chamber, means for supplying cooling water to the cooling water tube mounted in said fixture and to cause the cooling water to be supplied through said cooling water tube to said first named chamber, a cooling water return tube mounted in said second plate and extending through said body and opening into the compartment formed in said housing, and means for withdrawing the cooling water after it has passed through said housing.

2. In a torch assembly for supplying heat to an object, a plurality of torches, means for mounting said torches so that they are substantially equally spaced from each other and arranged to surround the object to be heated, each of said torches comprising a first plate having a plurality of holes therein extending over the area of the plate, a second plate spaced from the first plate and having at least a major portion thereof extending parallel to said first plate, said plate having a plurality of holes therein equal in number to the number of holes in the first plate, a plurality of tubes of relatively small diameter mounted in said holes in said first and second plates and extending between said first and second plates, said tubes being spaced apart so that there is a space between each tube and the adjacent tube, wall means connecting said first and second plates so that said first and second plates, said tubes, and said wall means form a closed chamber, said tubes having a length which is less than the longest dimension of said chamber, a body mounted on said wall means and forming a chamber outside said first named chamber and adjacent to the second plate so that the tubes mounted in said plates open into said second named chamber, said body having a passage therein opening into said second named chamber, a fixture spaced from said body, an elongate housing extending from said fixture to said body and forming a closed compartment, said fixture having a flow passage therein, a tube disposed in said housing and having one end in communication with said flow passage in said fixture and having the other end extending into said body and opening into said passage in said body, a cooling water tube disposed in said housing and having one end mounted in said fixture and having the other end extending through said body and through said second plate into said first named chamber, a cooling water return tube mounted in said second plate and extending through said body and opening into the compartment formed in said housing, means for supplying cooling water to the cooling water tube mounted in said fixture of each torch and to cause the cooling water to be supplied through said cooling water tube to said first named chamber, means for withdrawing the cooling water after it has passed through said housing of each torch, means for supplying mixed gases to the flow passage in said fixture of each torch so that the mixed gases pass through said tube in said housing into said second chamber and into said tubes mounted in said first and second plates, and shielding means mounted on each of said torches and overlapping each other to provide a substantially continuous shield surrounding the object being heated and for protecting said fixture and the means secured thereto.

References Cited by the Examiner

UNITED STATES PATENTS

| | | | |
|---|---|---|---|
| 850,581 | 4/1907 | Hopkins | 158—27.4 |
| 916,209 | 3/1909 | Smallwood | 158—107 |
| 945,966 | 1/1910 | Mahr | 263—5 |
| 1,389,301 | 8/1921 | Gilbert et al. | 158—27.4 |
| 2,130,261 | 9/1938 | Bucknam | 158—27.4 |
| 2,507,102 | 5/1950 | Hammon | 137—637.4 |
| 2,578,065 | 12/1951 | Hughey | 158—27.4 |

FOREIGN PATENTS

| | | |
|---|---|---|
| 504,733 | 8/1930 | Germany. |
| 12,519 | 9/1887 | Great Britain. |
| 754,402 | 8/1956 | Great Britain. |

JAMES W. WESTHAVER, *Primary Examiner.*

MEYER PERLIN, *Examiner.*